United States Patent [19]

Sano et al.

[11] Patent Number: 4,899,228
[45] Date of Patent: Feb. 6, 1990

[54] MANUALLY SWEEPING APPARATUS WITH IMAGE SENSOR

[75] Inventors: Teruo Sano, Kawasaki; Masaharu Shioya, Akikawa, both of Japan

[73] Assignee: Casio Computer Co., Ltd., Tokyo, Japan

[21] Appl. No.: 171,873

[22] PCT Filed: Jun. 12, 1987

[86] PCT No.: PCT/JP87/00380
§ 371 Date: Feb. 3, 1988
§ 102(e) Date: Feb. 3, 1988

[87] PCT Pub. No.: WO87/07804
PCT Pub. Date: Dec. 17, 1987

[30] Foreign Application Priority Data

Jun. 12, 1986 [JP] Japan ................... 61-134893
Dec. 24, 1986 [JP] Japan ................... 61-309421

[51] Int. Cl.⁴ ............................................. H04M 1/04
[52] U.S. Cl. .................................... 358/473; 358/497; 382/59; 346/76 PH
[58] Field of Search ............... 358/294, 293, 256, 473, 358/497; 382/59; 346/76 PH

[56] References Cited

U.S. PATENT DOCUMENTS 3,541,248 11/1970 Young .
3,767,020 10/1973 Rowe .
4,523,235 6/1985 Rajchman .
4,626,925 12/1986 Toyoda .
4,717,965 1/1988 Mashiko et al. .

FOREIGN PATENT DOCUMENTS 55-115773 9/1980 Japan .
57-119553 7/1982 Japan .
60-126632 7/1985 Japan .
60-244150 12/1985 Japan .

Primary Examiner—Edward L. Coles, Sr.
Attorney, Agent, or Firm—Frishauf, Holtz, Goodman & Woodward

[57] ABSTRACT

A small-sized copying apparatus has a housing (1). As the housing (1) is moved, an image data-reading circuit (15, 56, 57, 58) receives the light reflected from an original illuminated by a light source (11), and the image data obtained from the light is written into memory (60). Further, as the housing (1) is manually moved, the image data stored in the memory (60) is printed by means of a printing device (21, 65). Any desired reading width over which an image is to be read by the reading circuit (15, 56, 57, 58) can be electronically and/or mechanically designated by designating means (10a, 10c, 61, 63, 64, 64a, 64b).

17 Claims, 12 Drawing Sheets

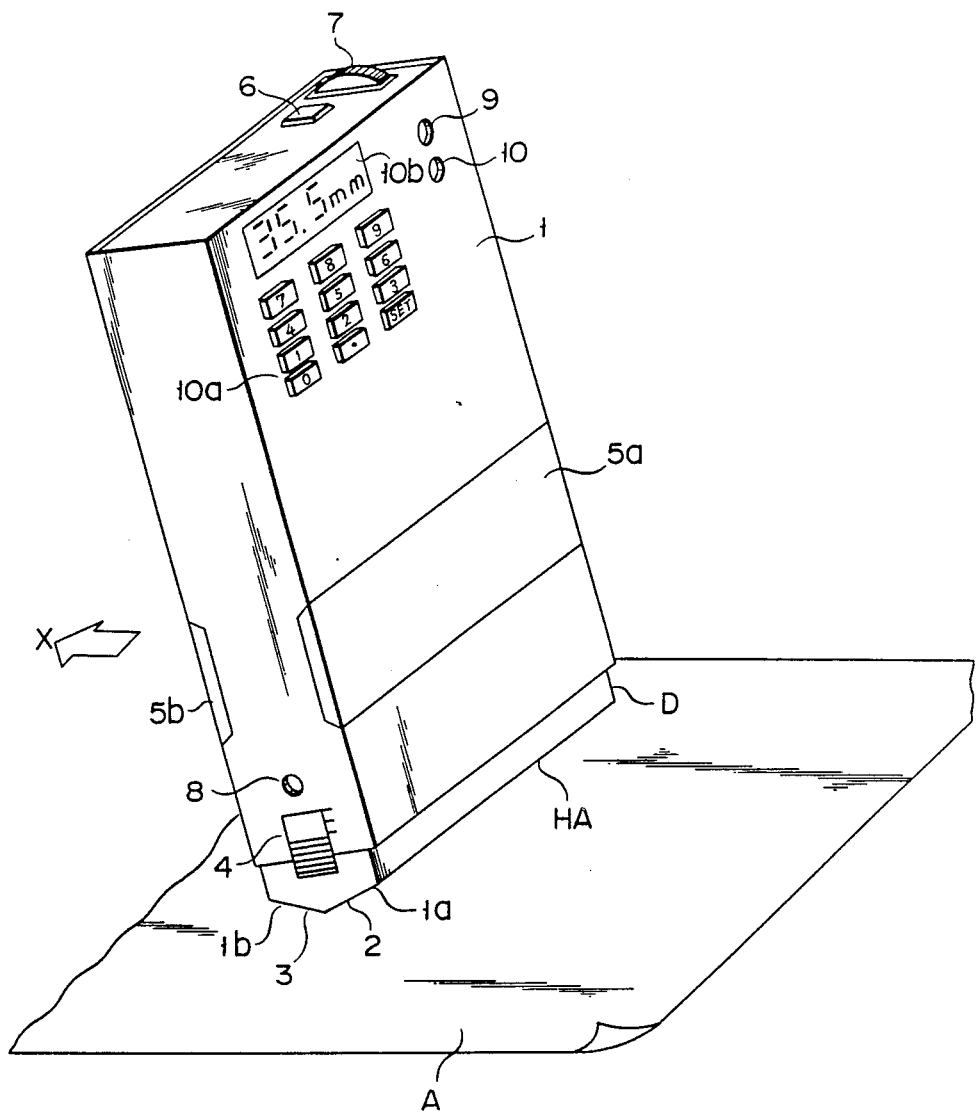
F I G. 1

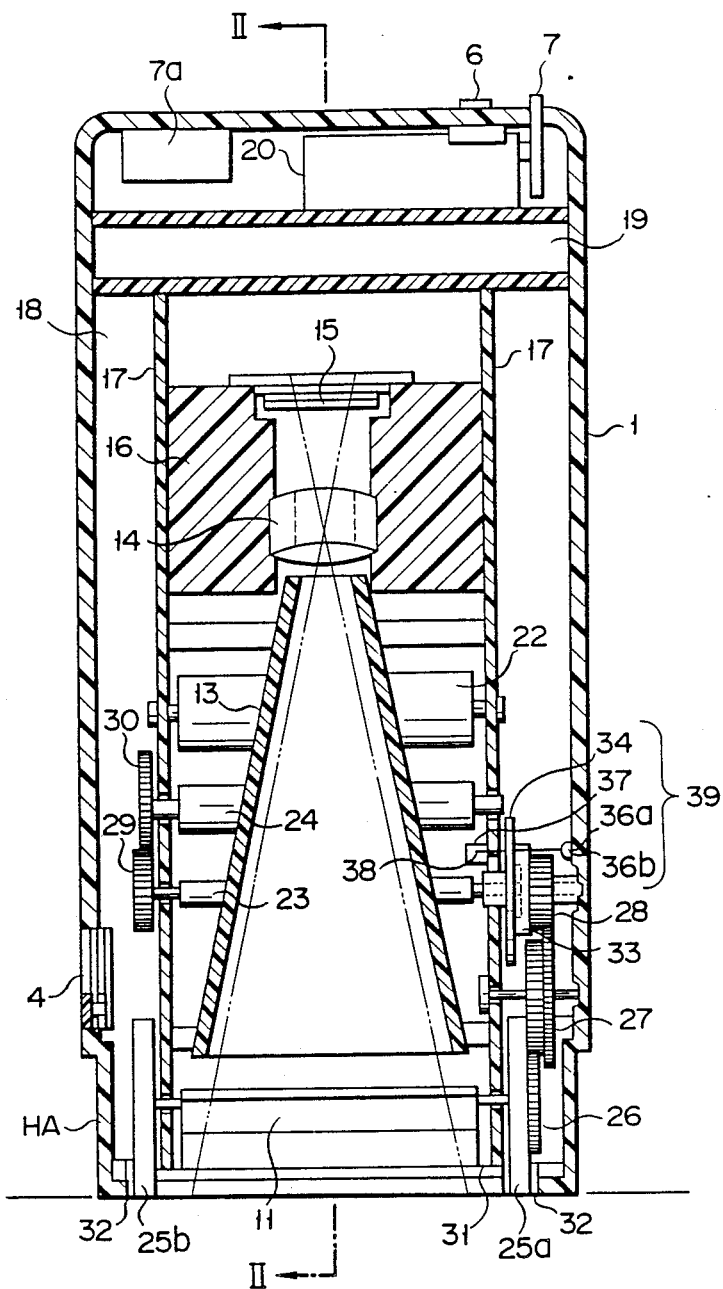
F I G. 2a

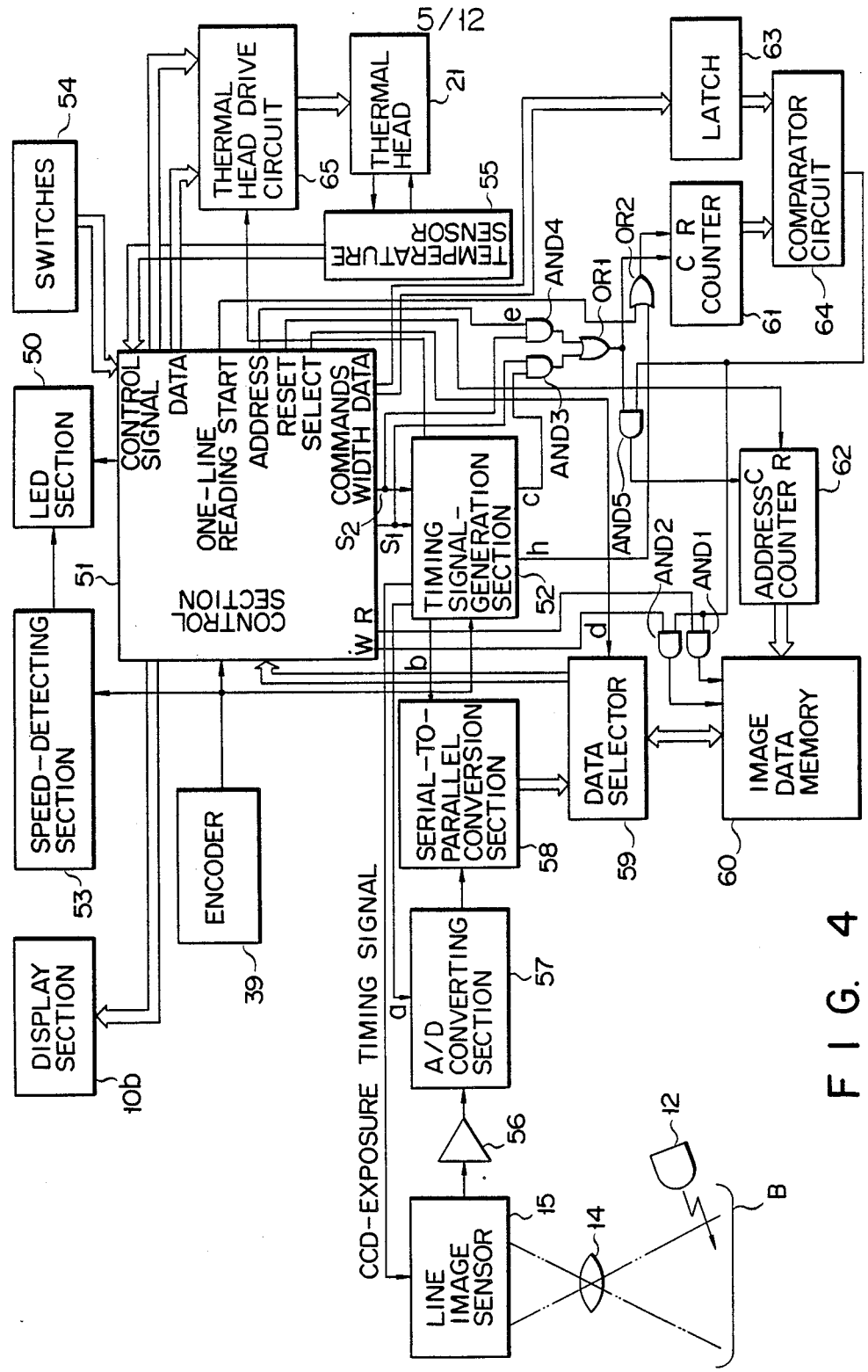
F I G. 4

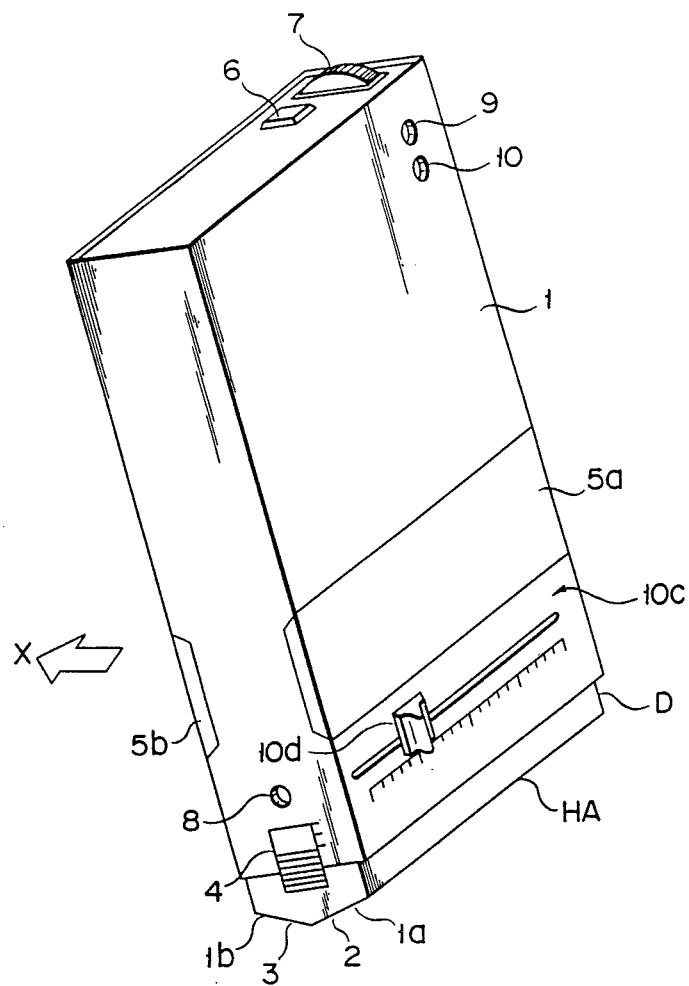
F I G. 7

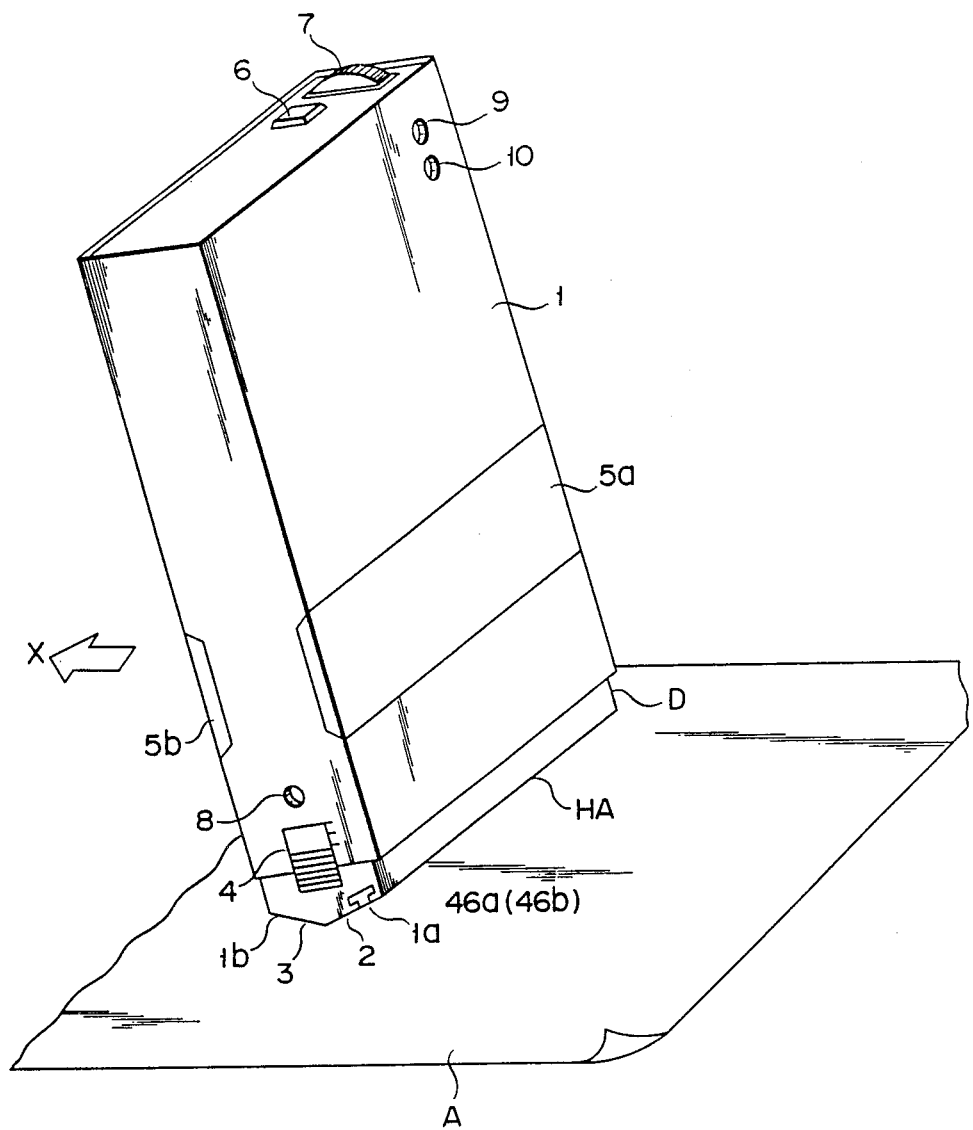
F I G. 8

MANUALLY SWEEPING APPARATUS WITH IMAGE SENSOR

TECHNICAL FIELD

The present invention relates to a small-sized copying apparatus, or a hand-held copier, whose main body can be manually moved to copy an original.

BACKGROUND ART

Japanese Patent Disclosure No. 55-115773 (Japanese Pat. Application No. 54-22445) discloses a manual sweeping copier whose main body is moved, thereby to copy an original. More specifically, while the copier is being manually swept, an optical element reads image data from the original. The image data is converted into digital data and written into a memory. The image data is read from the memory and is printed, thus copying the original.

The reading width of the small-sized copier disclosed in Japanese Patent Disclosure No. 55-115773 is determined by the width of the optical element, and the reading length of the copier is inevitably limited by the memory capacity of the memory. Therefore, even if the copier reads an image from an original having a width less than the reading width of the copier, it reads image data over the entire reading width. Consequently, the memory may become full before the copier is reads all image data from the original.

TECHNICAL SUBJECT

Accordingly, it is an object of the present invention to provide an apparatus which can read and store a great amount of image data even when an original has a small width, by setting a desired data-reading width, without wasting a memory region.

According to the present invention, there is provided an apparatus comprising image data-reading means, memory means for storing the image data read by the image data-reading means, designating means for designating a reading width over which image data will be read, the reading width being measured in the main scanning direction of the image data reading means, and means for writing into the memory means only the image data read by the image data reading means from a region whose width is equal to or less than the reading width designated by the reading width designating means. Since the apparatus has these components, it can read a great amount of image data by setting a desired reading width, without wasting a memory region. The apparatus of this invention has a housing and a linear scanning means arranged within the housing. The linear scanning means read image data through a image data-reading window cut in the housing. A slider is mounted on the housing, for closing the image data-reading window. Therefore, the reading width can be changed by only moving the slider, thus partly closing the window and thus setting a desired reading width, and the apparatus can read desired image data only.

BRIEF DESCRIPTION OF THE DRAWINGS

FIG. 1 is a perspective view showing the outer appearance of a hand-held copier which is a first embodiment of the present invention.

FIG. 2(a) is a sectional view showing the internal structure of the copier shown in FIG. 1.

FIG. 4 is a block diagram showing an electronic circuit.

FIG. 7 is a perspective view showing the outer appearance of a hand-held copier which is a second embodiment of the present invention.

FIG. 8 a perspective view showing the outer appearance of a hand-held copier which is a third embodiment of the present invention.

DESCRIPTION OF THE PREFERRED EMBODIMENTS

Figure 2B:
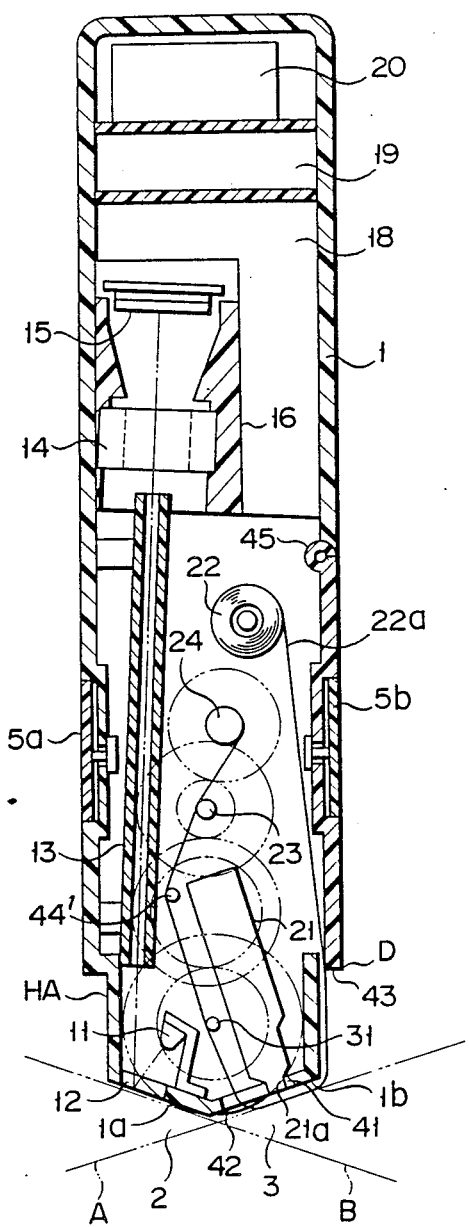
FIG. 2(b) is a sectional view, taken along line II—II in FIG. 2(a).

The first to third embodiments of the present invention will be described with reference to FIGS. 1 to 3. FIG. 1 is a perspective view showing the first embodiment of the invention. In FIG. 1, numeral 1 designates the housing of the hand-held copier, which is 70 mm wide, 30 mm deep, and 160 mm high. The copier can read and print an image having a maximum width of 40 mm and can read an image having a maximum length of 200 mm. It can read and print an image in a resolution of 8 dots/mm at most. Head section HA, which is designed to read and print an image, is attached to the distal end, or the lower end, of housing 1. Head section HA is not as wide or as deep as housing 1. Therefore, stepped portion D is formed between head section HA and housing 1. The distal end of head section HA consists of two long, narrow inclined surfaces 1a and 1b. These surfaces are joined at their lower sides, thus forming a ridge. Reading section 2 is mounted on surface 1a, and printing section 3 is mounted on surface 1b. Power/read/print switch 4 is provided on one side of housing 1, and located at the lower end of this side. Operation keys 5a and 5b are provided on the front and rear surfaces of housing 1, respectively. Operation keys 5a and 5b are shaped like plates. That portion of housing 1 on which these switches are provided, can be held between an operator's thumb and fingers, so that housing 1 of the hand-held copier can be moved back and forth. Power/read/print switch 4 serves to turn the copier on or off, and to set the copier in a reading mode or a printing mode. More precisely, when switch 4 is used in selecting either the reading mode or the printing mode, the power is supplied to the copier. Further, clear key 6, and density control dial 7 for controlling the print density are provided on the proximal (or upper) end of housing 1. Clear key 6 when pushed clears an image data memory (later described in detail) if the hand-held copier is set in the reading mode, and initializes the address of the image data memory when the copier is set in the printing mode. LED 8 is provided near reading section 2 and used as a power-supply pilot lamp. LEDs 9 and 10 are provided on the front surface of housing 1, and located near the proximal end of housing 1. LED 9 is a memory pilot lamp, and LED 10 is a speed alarm lamp.

Further, key-input section 10a and a display section 10b are arranged on the front surface of housing 1. Key-input section 10a has numeric keys, a point key ".", and a set key "SET". These keys function, thereby to set an effective data-reading width not exceeding 40 mm. The data-reading width set by operating key-input section 10a is displayed by display section 10b.

In order to read image data of an original from the hand-held copier, power/read/print switch 4 is moved to a "read" position. The copier is thereby turned on, and LED 8 emits light. The operator holds the copier and sweeps it across the original, while depressing both operation keys 5a and 5b and keeping reading section 2 in contact with the original. When the copier is moved across the original at a speed higher than a predetermined value, LED 10 emits light, thereby informing the operator of this fact. In this case, when the desired data-reading width is less than the width of reading section 2 of head section HA, key-input section 10a has been operated, thus setting the effective data-reading width.

To pint the image data read from the original, power/read/print switch 4 is moved to a "print" position. The copier is then held and moved across a piece of recording paper A, in the direction of arrow X, while depressing both operation keys 5a and 5b and keeping printing section 3 in contact with paper A. As a result, the image data is printed on paper A. The printed image has a width equal to the effective data-reading width which has been set before the data-reading operation.

Reading section 2 and printing section 3, both provided within housing 1, will now be described in detail with reference to FIGS. 2(a) and 2(b) and FIG. 3. As is shown in FIGS. 2(a) and 2(b), reading section 2 includes light source 11 made of an LED array and located close to inclined surface 1a. The light emitted from this light source is applied through window 12 of inclined surface 1a and illuminates original B. In housing 1, light guide 13 is arranged, and lens 14 and line image sensor 15 are located above light guide 13, and are spaced apart from each other for a predetermined distance. The line image sensor 15 is, for example, a 1024-bit CCD (charge coupled device). Of 1024 bits, 320 bits are used to read an image having a maximum width of 40 mm, in a resolution of 8 dots/mm. Lens 14 and line image sensor 15 are held in specified positions by supporting member 16. This supporting member 16 is fastened to inner frame 17 provided within housing 1 by a predetermined distance therefrom. Space 18 accommodating electronic parts is provided within housing 1, on one side of supporting member 16. Space 19 accommodating a battery is also provided within housing 1, and is connected to a circuit board (not shown) located in space 18. Clear key 6, density control dial 7, key-input section 10a, display section 10b, and the like, are connected to circuit board 20.

Within inner frame 17, there are provided thermal head 21, ink ribbon roll 22, roller 23 for feeding ribbon 22a at a constant speed, and ribbon take-up roller 24. Rubber rollers 25a and 25b, and gears 26, 27, 28, 29 and 30 are provided in the space between inner frame 17 and the inner surfaces of housing 1. Rubber rollers 25a and 25b are rotatably mounted on shaft 31 extending horizontally across inner frame 17 and protruding at both ends from inner frame 17. Parts of their peripheries outwardly protrude through slits 32 cut in the end portions of inclined surfaces 1a and 1b. Gear 26, which has a smaller diameter than rubber rollers 25a, is coupled to gear 28 by intermediate gear 27. Gear 28 is coupled to the shaft of ribbon-feeding roller 23 by clutch 33. Only when the hand-held copier is moved to print image data, will clutch 33, which is of a one-way type, transmit the rotation of gear 28 to ribbon-feeding roller 23. Encoder disk 34 is fastened to the input-end of clutch 33. Encoder disk 34 can rotate, independent of the one-way clutch 33 operation, when gear 28 rotates. As is shown in FIG. 3, encoder disk 34 has a number of radial slits 35 located at regular intervals in the circumferential direction of disk 34. LED 36 is located on one side of disk 34, and photosensor 37 is provided at the other end of disk 34. As is illustrated in FIG. 2(a), LED 36 is secured to the inner surface of housing 1, and photosensor 37 is fixed to the inner surface of inner frame 17. Hole 38 is cut in frame 17, coaxially positioned with respect to photosensor 37. Hence, the light emitted from LED 36 can be applied to photosensor 37 through slits 35 of encoder disk 34 and through hole 38. Encoder disk 34, LED 36, and photosensor 37 constitute encoder 39

Figure 3:
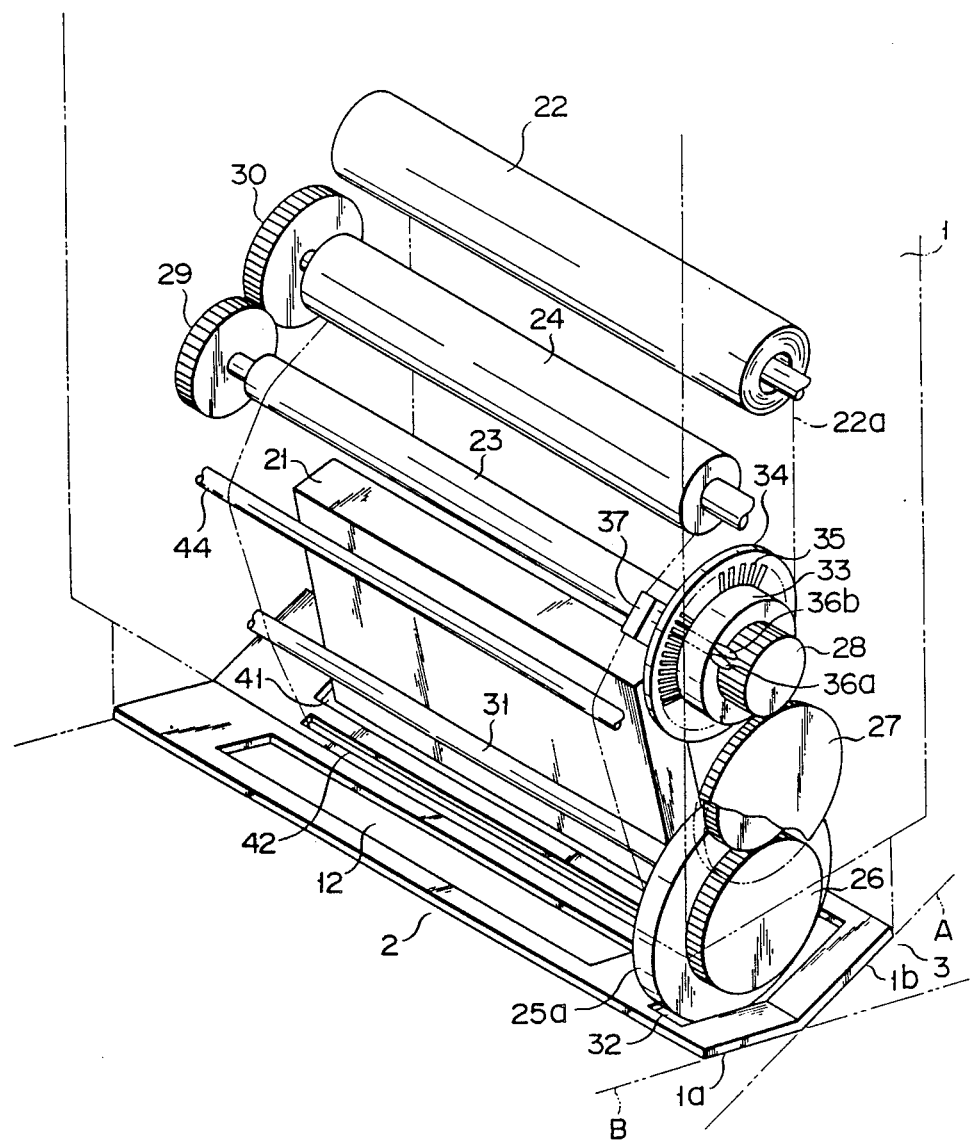
FIG. 3 is a perspective view showing the main components arranged within the copier.

As is shown in FIG. 3, printing window 41 and ribbon-guiding window 42 are cut in inclined surface 1b and extend parallel to one another. Ribbon-guiding window 42 is located nearer to inclined surface 1b than printing window 41. Thermal head 21 has heating section 21a, which is inserted in printing window 41. Heating section 21a slightly protrudes from inclined surface 1b. Slit 43 is cut in stepped portion D, close to that side of the housing on which operation key 5b is provided. Thermal-transfer ink ribbon 22a fed out of roll 22 is led from housing 1 though slit 43, and then guided into housing 1 through ribbon-guiding window 42 after passing heating section 21a of thermal head 21. Within housing 1, ink ribbon 22a is guided by shaft 31, ink ribbon guide 44, and constant-speed ribbon-feeding roller 23, and is finally wound up around ribbon take-up roller 24. Further, as is shown in FIG. 2(b), the lower half of housing 1, on that side which operation switch 5b is mounted, can be opened when pivoted around hinge 45. When the lower half of this side is open, used ribbon roll 22 can be replaced, and the interior of housing 1 can be inspected.

The electronic circuit, which is formed on circuit board 20 provided within space 18, will now be explained with reference to FIG. 4. As has been described, encoder 39 comprises encoder disk 34, LED 36, and photosensor 37. Encoder 39 outputs pulse signals representing the distance over which housing 1 has been moved. In other words, it outputs a distance signal. The distance signal output by encoder 39 is supplied to control section 51, timing signal-generating section 52, and speed-detecting section 53. Operation signals are supplied to control section 51 from power/read/print switch 4, operation switches 5a and 5b, clear key 6, density control dial 7, and keys 54. Further, a temperature signal is supplied to section 51 from temperature sensor 55 upon detection of the temperature of thermal head 21. A power-source voltage detector (not shown) is provided in control section 51. Control section 51 controls powersupply pilot LED 8 and memory pilot LED 9 of LED section 50, and also controls the other components of the circuit. When power/read/print switch 4 is operated, thus designating the reading mode or the printing mode, control section 51 gives operation commands S1 or S2 to timing signal-generating section 52. More specifically, control section 51 supplies command S1 to section 52 when the reading mode is selected, and command S2 to section 52 when the printing mode is selected.

When operation command S1 is supplied from control section 51 to timing signal-generating section 52, timing signal-generating section 52 generates CCD-exposure timing signals at regular intervals. Further, section 52 generates various timing signals such as a predetermined number of read-timing signals a, serial-to-parallel conversion signals b, clock pulses c, and encoder pulses h, in synchronism with the output signal of encoder 39 which represents the distance which the hand-held copier has been moved. Section 52 generates print-timing signals upon receiving operation command S2 from control section 51. The CCD-exposure timing signals output from timing signal-generating section 51 are supplied to line image sensor 15. Read-timing signals a are supplied to A/D converting section 57. Serial-to-parallel conversion signals b are supplied to serial-to-parallel conversion section 58. Clock pulses c are supplied to address counter 62 via AND gate AND3, OR gate OR1 and AND gate AND5. Encoder pulses h are supplied through OR gate OR2 to reset terminal R of counter 61 (later described). Line image sensor 15 receives the light reflected from original B in synchronism with the CCD-exposure timing signals, and output analog signals. The output signals of the image sensor are output to A/D converting section 57 via amplifier 56. A/D converting section 57 converts these signals into binary signals, i.e., black and white signals, in synchronism with read-timing signals a. The binary signals are supplied to serial-to-parallel conversion section 58. Serial-to-parallel conversion section 58 converts the input signals to, for example, an 8-bit parallel signal. This parallel signal is output to image data memory 60 via data selector 59. Read signal R is supplied to image data memory 60 from control section 51 via AND gate AND1, and write signal W is supplied from section 51 via AND gate AND2. Both AND gates AND1 and AND2 are turned on by a "1" (high) level signal output from comparator circuit 64 (later described). Data selector 59 is connected to control section 51 by a data line, and selects either control section 51 or image data memory 60 in accordance with selection signal d supplied from control section 51. A desired write address of image data memory 60 (a line address and a digit address) is designated by address counter 62. Clock pulses c are supplied to address counter 62 from timing signal-generating section 51 via AND gate AND3, OR gate OR1 and AND gate AND5. AND gate AND3 is turned on by read command S1 supplied by control section 51. AND gate AND5 is turned on by a "1" (high) level signal output from comparator circuit 64. Any desired read address of image data memory 60 is given from address counter 62 under control of control section 51. In this case, address counter 62 counts up the read addresses in response to address signals e supplied from control section 51 via AND gate AND4, OR gate OR1, and AND gate AND5. AND gate AND4 is turned on by print command S2 supplied from control section 51. Comparator circuit 64 receives and compares designated reading-width data and designated write- or read-address data. The designated reading-width data corresponds to the address value latched in latch circuit 63, and the designated write- or read-address data corresponds to the count value of counter 61. When the designated reading-width data is greater than the designated write- or read-address data, comparator circuit 64 outputs a "1" signal to AND gates AND1, AND2, and AND5. On the other hand, when the designated reading-width data is less than the designated write- or read-address data, comparator circuit 64 outputs a "0" signal to AND gates AND1, AND2, and AND5.

When the hand-held copier is set in the printing mode after the image has been read from the original B, control section 51 outputs operation command S2 to timing signal-generating section 52, as has been described above. Section 51 then sequentially reads the data stored in image data memory 60 via data selector 59, in response to the output distance signal by encoder 39. After reading the image data from image data memory 60, control section 51 calculates the time for supplying power to thermal head 21, based on the number of black characters represented by the print data, the temperature of head 21 detected by temperature sensor 55, the data output by the power-source voltage detector, and the density selected by turning density control dial 7. The data representing the power-supplying time is output as print data to thermal head-driving circuit 65. In accordance with this print data thermal head-driving circuit 65 drives thermal head 21 in synchronism with the timing signals supplied from timing signal-generating section 52.

The operation of the first embodiment described above will now be explained. To read the image data, such as characters and an image, from an original, a user moves power/read/write switch 4 from a "power off" position to the "read" position. Thereby, power is supplied to the circuit components. At this time, control circuit 51 turns on LED 8 of LED section 50, thereby informing to a user that the copier has been turned on. Further, control section 51 supplies operation command S1 to timing signal-generating section 52. In this condition, the user sweeps housing 1 in a forward direction across a desired part of original B of operation key 5a (in the direction opposite of arrow X, in FIG. 1), while at the same time keeping reading section 2 of head section HA in contact with original B and depressing both operation keys 5a and 5b. The light emitted from light source 11 is directed onto original B through window 12 cut in inclined surface 1a. The light is then reflected from original B and guided by light guide 13. Finally the light is applied to line image sensor 15 via lens 14. As housing 1 of the hand-held copier is moved as described above, rubber rollers 25a and 25b, both contacting original B, are rotated. The rotation of these rubber rollers causes gear 28 to rotate via gears 26 and 27. Hence, gear 28 is rotated, thereby rotating encoder disk 34 at a speed proportional to the speed at which housing 1 is being moved. As encoder disk 34 rotates in this way, the light emitted from LED 36 is intermittently applied to photosensor 37 though slits 35. Photosensor 37 produces pulses, the output signal of encoder 39. This output signal, which represents the distance the copier has been moved, is supplied to control section 51, timing signal-generating section 52, and speed-detecting section 53.

In the meantime, timing signal-generating section 52 generates CCD-exposure timing signals in response to operation command S1 supplied by control section 51, and supplies these CCD-exposure timing signals to line image sensor 15. Further, section 52 generates, also in response to operation command S1, read-timing signals a and serial-to-parallel conversion signals b, and supplies signals a to A/D converting section 57, and signals b to serial-to-parallel conversion section 58. Still further, timing signal-generating section 52 generates clock pulses c in synchronism with serial-to-parallel conversion signals b. These pulses c are supplied to counter 61 and address counter 62.

Line image sensor 15 produces image signals from the light reflected off original B, in synchronism with CCD-exposure timing signals output from timing signal-generating section 52. The image signals are amplified by amplifier 56 and then supplied to A/D converting section 57. A/D converting section 57 converts the image signals output from amplifier 56, into a serial-digital signal, in synchronism with read-timing signals a supplied from timing signal-generating section 52. The digital signal is input to serial-to-parallel conversion section 58. Serial-to-parallel conversion section 58 converts the serial-digital signal into, for example, 8-bit parallel image data, in synchronism with serial-to-parallel conversion signals b supplied by timing signal-generating section 52. The 8-bit image data is output to data selector 59. Data selector 59 selectively delivers the output of serial-to-parallel conversion section 58, in response to selection signal d supplied by control section 51 when the copier is set in the reading mode. Therefore, the image data output from serial-to-parallel conversion section 58 is supplied to image data memory 60 via data selector 59. The write addresses of image data memory 60 are designated by address counter 62. In this case, no reading-width has yet been specified. Hence, comparator circuit 64 outputs a "1" signal at all times. The count value of address counter 62, which defines the digit address, is incremented by "+1" every time clock pulse c is input to address counter 62 from timing signal-generating section 52. Thus, the addresses of image data memory 60 are sequentially designated. Timing signal-generating section 52 stops producing timing signals after the image data for one line has been written into image data memory 60. It refrains from producing timing signals until it receives the next pulse signal from encoder 39, which represents the distance the copier has been moved. The sequence of the operations described above is repeated, whereby the image data read from original B is written line by line into image data memory 60.

It will now be explained as to how the hand-held copier reads image data of which the reading width is less than the width of head section HA.

Let us assume that the "3" key, the "5" key, the point "." key, the "5" key the "SET" key of key-input section 10a are depressed, thereby designating a reading width of 35.5 mm. The address value corresponding to this designated reading width measured in the main scanning direction of line image sensor 15 is supplied from control section 51 to latch circuit 63, and is thus latched in latch circuit 63. Thereafter, the user sweeps housing 1 across the desired part of original B. As housing 1 is thus moved, timing signal-generating section 52 generates timing signals. Hence, the image is read by line image sensor 15 in synchronism with these timing signals generated by section 52. The image data read by line image sensor 15 is written into image data memory 60, as explained by the flow chart of FIG. 5.

More specifically, in step R1, encoder pulses are generated from encoder 39, as housing 1 is moved. In step R2 counter 61 is reset by the first encoder pulse h supplied by timing signal-generating section 52. Then, in step R3, the image signals output from line image sensor 15 via A/D converting section 57 are converted into 8-bit parallel signals by serial-to-parallel conversion section 58. In the next step, R4, clock pulses c are supplied from timing signal-generating section 52 to counter 61 and address counter 62. In step R5, comparator circuit 64 compares the designated reading-width data, which has been converted to the address value and latched in latch circuit 63, with the address value counted by counter 61 and representing the distance, in the main scanning direction, the original B has actually been scanned, in other words, it is determined in step R5 whether or not the count value of counter 61 is less than the designated reading width. If Yes, that is, if the distance is shorter than the designated reading width, comparator circuit 64 outputs a "1" signal in step R6. As a result, the image signals, i.e., the parallel signals output from serial-to-parallel conversion section 58, are written via data selector 59 at the write address of image data memory 60, which has been designated by address counter 62. Thereafter, in step R7, it is determined whether or not one-line image data has been read from the original. If it is determined, from the output of encoder 39, that the one-line image data has not been read, steps R3 through R6 are repeated, the image signals further output from serial-to-parallel conversion section 58 are sequentially written into write addresses of image data memory 70, which are sequentially designated by address counter 62. When line image sensor 15 has scanned the original over the designated reading width of 35 mm in the main scanning direction, comparator circuit 64 outputs a "0" signal. In other words, a result "No" is obtained in step R5. In this case, AND gate AND2 is turned off, thereby stopping the writing of data into image data memory 60. Simultaneously, AND gate AND5 is turned off, whereby address counter 62 stops counting write addresses. Hence, the image data corresponding to one line having a length equal to the designated reading width has been written in the write addresses. When housing 1 is further moved, and encoder 39 outputs another encode pulse, the operation returns to step R1, and the nest to the last write address for the first line image data is designated. The writing of the second line image data is thus begun.

It will now be further explained as to how the hand-held copier prints the image data read from original B in the manner described above. To print the image data which has been read over the width of image sensor 15, not having designated a specific reading width, power-/read/write switch 4 is moved to the "print" position, thereby setting the copier in the printing mode. When switch 4 is thus moved, control section 51 supplies selection signal d to data selector 59, whereby data selector 59 is switched to the side of control section 51. In this condition, the user sweeps housing 1 across a sheet of paper A in the direction of arrow X (FIG. 1), while keeping printing section 3 of head section HA in contact with paper A and depressing both operation keys 5a and 5b. As housing 1 is moved in this way, rubber rollers 25a and 25b rotate, thereby rotating gears 26, 27 and 28. Encoder disk 34, which is fastened to gear 28, is therefore rotated. As a result of rotation of disk 34, photosensor 37 outputs pulses, as in the case of reading the image data, which forms a signal representing the distance the copier has been moved across paper A.

The rotation of gear 28 causes one-way clutch 33, ribbon-feeding roller 23, and further ribbon take-up roller 24 to rotate via gears 29 and 30. As rollers 23 and 24 rotate, ribbon roll 22 also rotates. Hence, ink ribbon 22a is fed from roll 22 and guided through slit 43 cut in stepped portion D. Ribbon 22a then passes by heating section 21a of thermal head 21. It is further guided through ink ribbon-guiding window 42, and then guided by shaft 31, ink ribbon guide 44, and ribbon-feeding roller 23. Finally, ribbon 22a is wound around ribbon take-up roller 24. As housing 1 is moved, ribbon-feeding roller 23 rotates such that ribbon 22a is fed at the same speed as housing 1 is being moved across paper A. Hence, no relative movement occurs between ribbon 22a and paper A.

The output signal of encoder 39, i.e., the output pulses of photosensor 37, which represents the distance the copier has been moved, are supplied to control section 51, timing signal-generating section 52, and speed-detecting section 53. Timing signal-generating section 52 supplies a one-line printing command to control section 51 in response to the output signal of encoder 39. It also supplies print-timing signals to thermal head-driving circuit 65 in response to the output signal of encoder 39. In accordance with the output signal of encoder 39, control section 51 designates one after another, the line addresses and digit addresses of image data memory 60. Hence, the image data stored in image data memory 60 is read out through data selector 59 and is input line by line, to thermal head-driving circuit 65. In response to the one-line printing command, control section 51 calculates and sets the time for supplying power to thermal head 21, based on the number of black characters represented by the print data, the temperature of thermal head 21 detected by temperature sensor 55, the output signal of the power-source voltage detector, and the density selected by rotating density control dial 7. Then, control section 51 supplies thermal head-driving circuit 65 with the image data read out from image data memory 60. Thermal head-driving circuit 65 drives thermal head 21 in accordance with the control data supplied by control section 51 and the timing signals output from timing signal-generating section 52. Thermal head 21 prints the image data on paper A using ink ribbon 22a. As housing 1 of the hand-held copier is moved across paper A, the unused portion of ink ribbon 22a is fed from roll 22, whereas the used portion of ribbon 22a is wound around ribbon take-up roller 24. In this manner, the image data stored in image data memory 60 is printed on paper A as housing 1 of the copier is swept across paper A.

Figure 6:
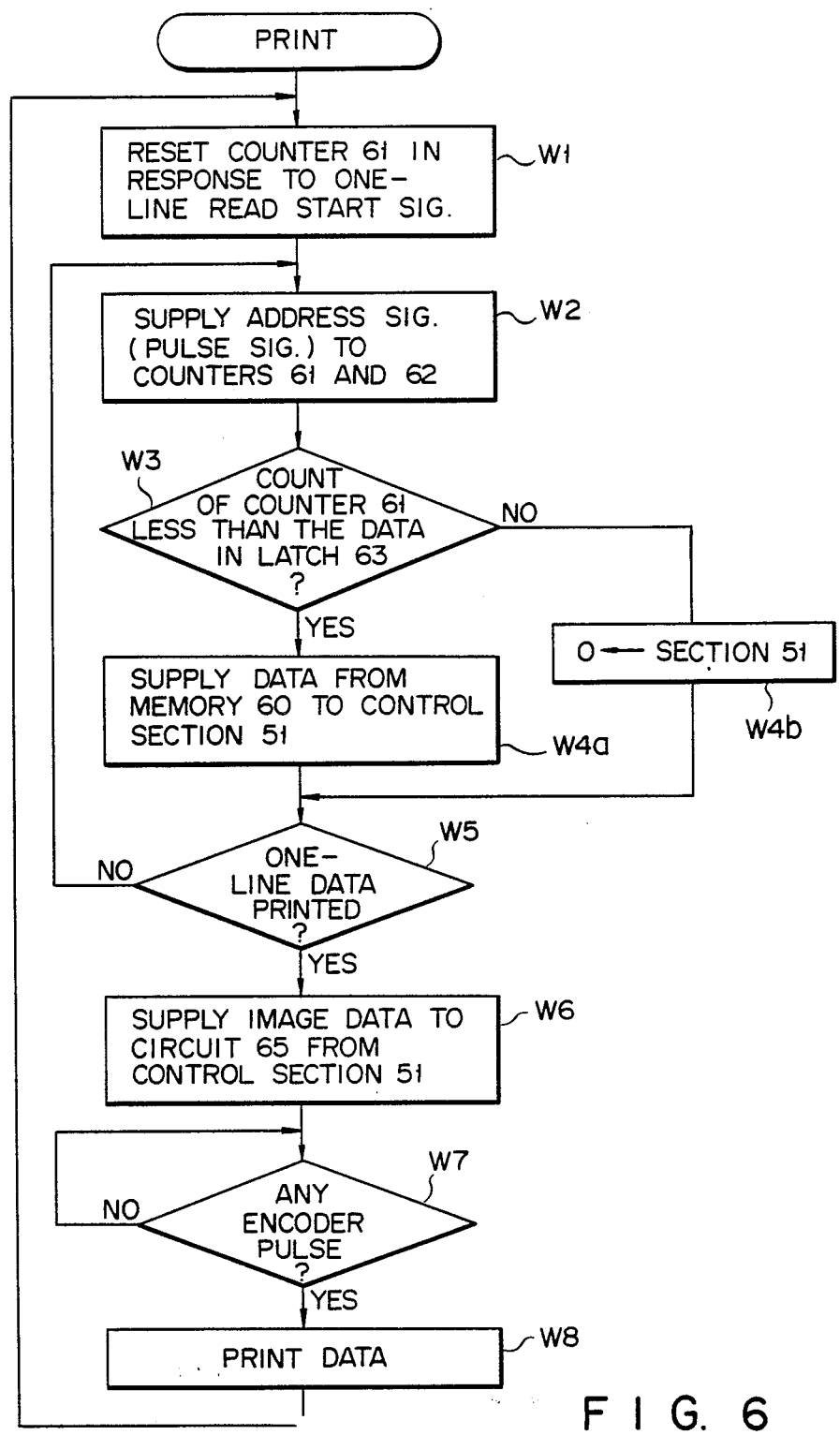
FIG. 6 is a flow chart explaining how to print the image data read after a data-reading width has been set.
Figure 9:
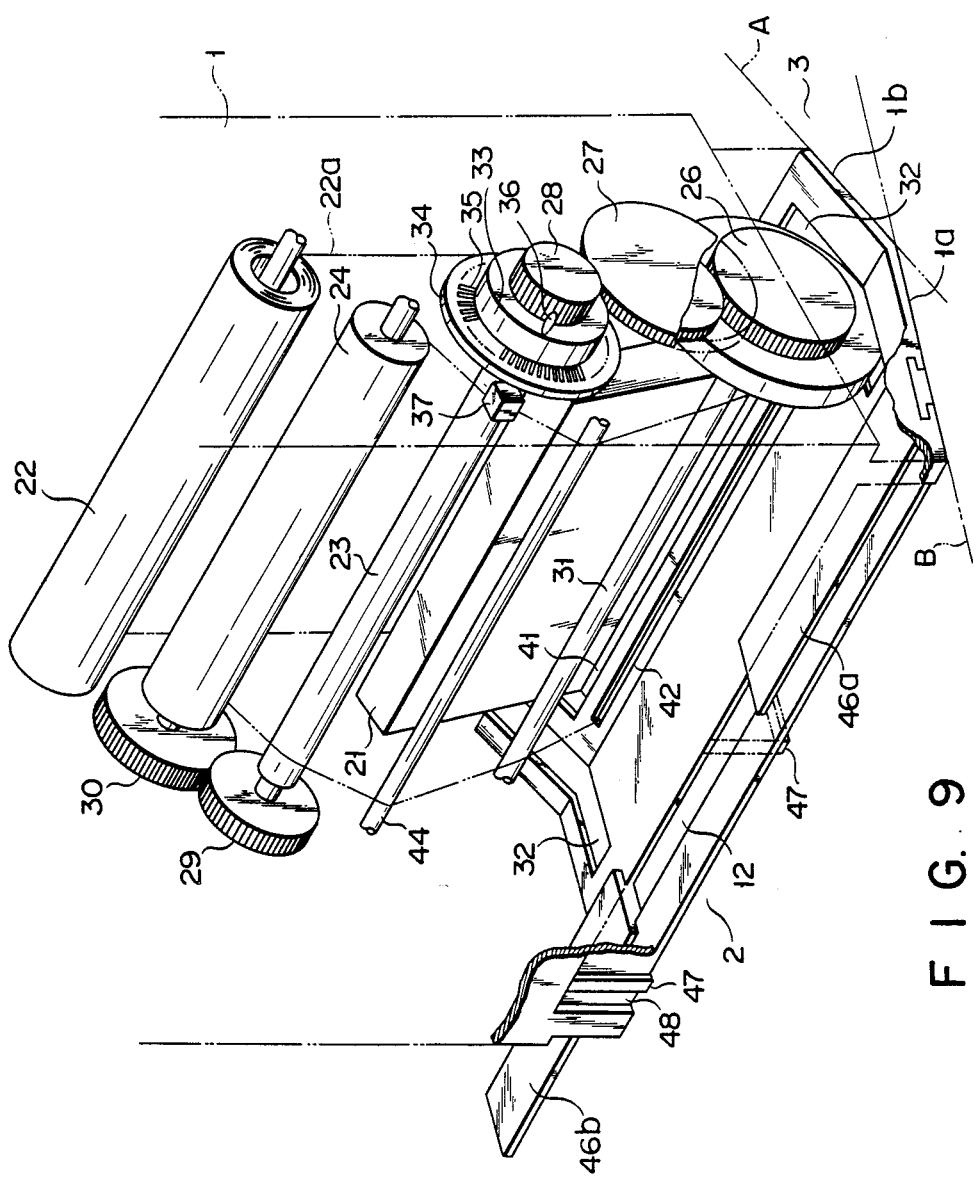
FIG. 9 is a perspective view showing the main components arranged within the copier of FIG. 8.
Figure 10:
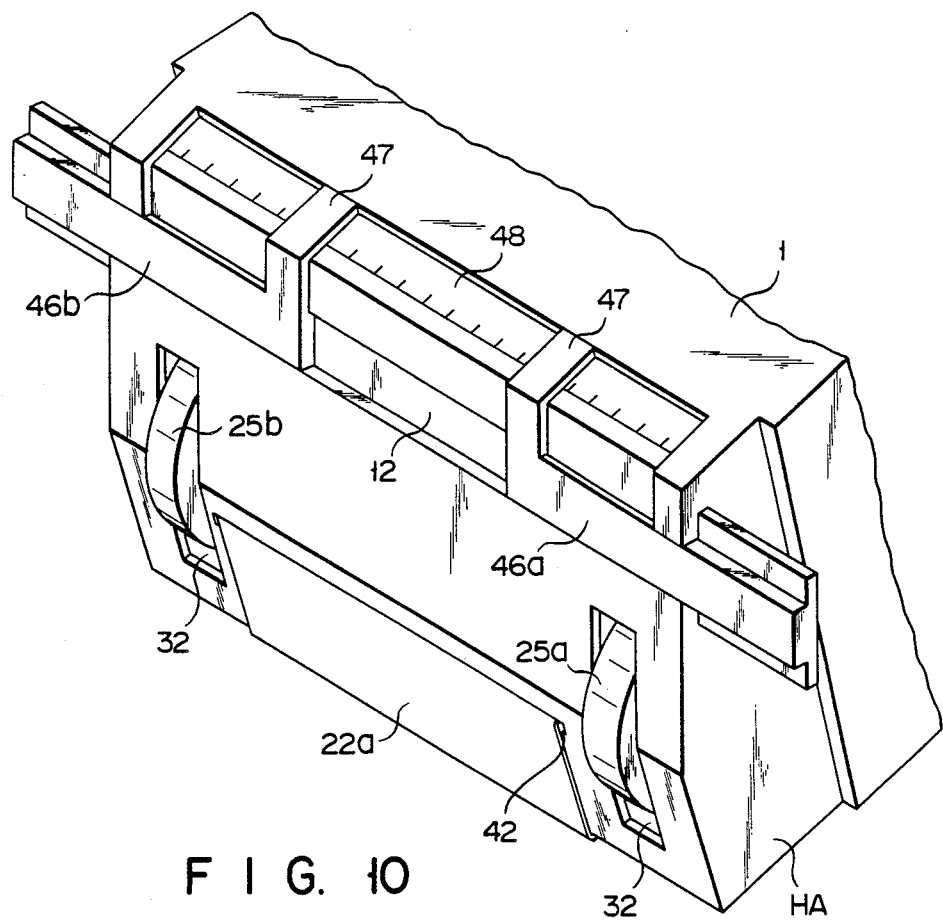
FIG. 10 is a perspective view showing the outer appearance of the reading section of the copier of FIG. 8.
Figure 11:
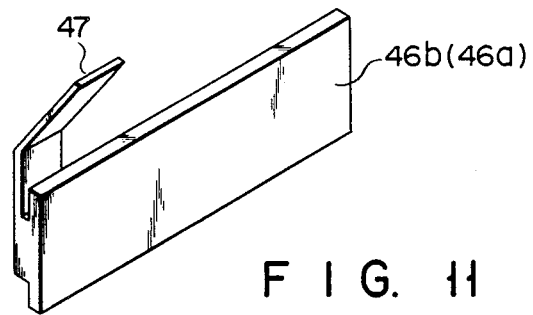
FIG. 11 is a perspective view of a slider for closing the data-reading window of the copier shown in FIG. 8.

To print the image data read from the original after designating a width by key input section 10a as a reading width of, for example, 35 mm of image sensor 15, the hand-held copier is operated as shown in the flow chart of FIG. 6.

When the printing mode is set, control section 51 outputs print command S2 in step W1. At the same time, a one-line reading start signal is output from control section 51 to counter 61 through OR gate OR2, thereby resetting counter 61. In step W2, address signal e (a pulse signal), which designates a read address, is supplied through AND gate AND4 to counter 61 and address counter 62. Then, counter 61 begins counting the addresses corresponding to the dot elements of thermal head 21 arranged in a dot direction. Also, address counter 62 begins counting read addresses of image data memory 60. Then, in step W3, comparator circuit 64 compares the address value counted by counter 61 and representing the position of any dot element, with the designated reading-width data was latched at the beginning of the data-reading operation. When the address value for the dot element is less than the designated reading-width data, comparator circuit 64 outputs a "1" signal. If this is the case, in the next step, W4a, the image data is read from the read address of image data memory 60, which has been designated by address counter 62. This image data is input to the print data register provided within control section 51 via data selector 59. In step W5, it is determined whether the one-line image data has been read to control section 51 or not. If No, steps W2 through W4a are repeated, whereby print data is read out item by item, from image data memory 60 to control section 51.

If Yes in step W3, that is, if the address value counted by counter 61 reaches the value of designated reading-width data, it is determined that one-line print data representing a line of image which is 35.5 mm long is fetched in control section 51. Then, comparator circuit 64 outputs a "0" signal. As a result, data-reading from imaged data memory 60 is prohibited, and address counter 62 also stops counting read addresses. Then, steps W2, W3, W4b and W5 are repeated, whereby "0" (blank) data is input to the print data register of control section 51, in the memory region for 5 mm of this register, along with image data for 35.5 mm (i.e., the designated reading width).

Figure 5:
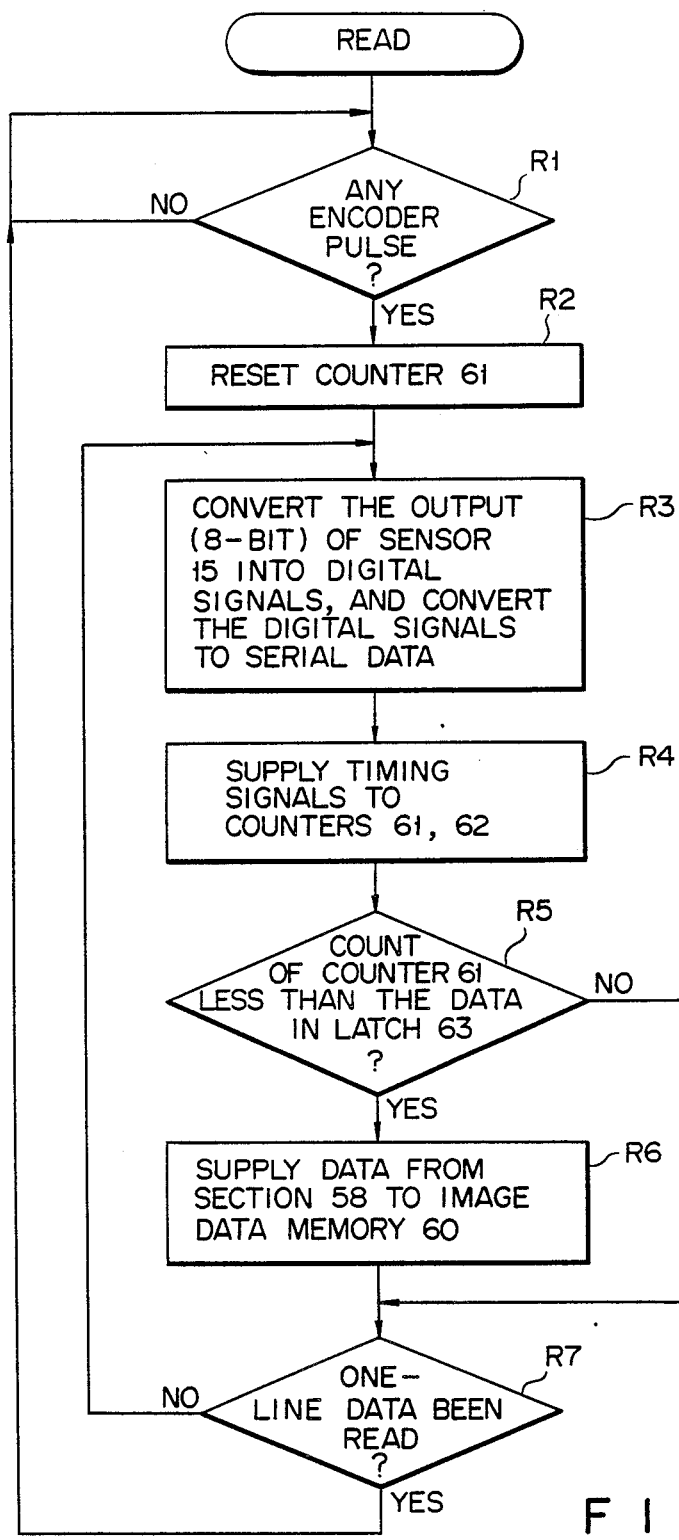
FIG. 5 is a flow chart explaining how to write image data into an image data memory when a specific data-reading width has been set.

When the one-line print data has been input to the print data register provided within control section 51, the operation goes from step W5 to step W6. In step W6, the image data is transferred from the print data register to thermal head-driving circuit 65. This image data includes the image data for the designated reading width, which has been read from image data memory 60, and the blank data, and corresponds to one line of dot elements of thermal head 21. In step W7, it is determined whether or not encoder 39 has output an encoder pulse, showing that housing 1 has been further moved. If Yes, thermal head-driving circuit 65 supplies the one-line print data to thermal head 21, in accordance with print-timing signals supplied from timing signal-generating section 52. In step W8, the image data for one line of dots is printed. That is, the first line of the image data which has been read over the designated reading-width and then written into image data memory 60, as shown in the flow chart of FIG. 5, is printed on paper A for the distance equivalent to the designated reading width. Thereafter, steps W1 to W8 are repeated, all image data read from the original B and written into image data memory 60 is read out from memory 60, line by line, and the lines of the image, which have the length equal to the designated reading width, are printed on paper A, one after another.

Hence with the hand-held copier described above, it is possible to designate any reading width that is less than the main-scanning width of line image sensor 15. Therefore, only the desired part of the image formed on original B can be read and written into image data memory 60. Since an unnecessary part of the original image is not written into memory 60, the memory area of image data memory 60 can be used with high efficiency. The copier can, therefore, read only required image data as much as can be stored in image data memory 60.

In the above embodiment, latch circuit 63 stores the value input by operating key-input section 10a. Instead, it can store a value obtained by multiplying the key-input value by a predetermined constant. Any data that can be compared with the count value of counter 61 can be stored in latch circuit 63.

Further, in the first embodiment, a reading width is designated by depressing the numeral keys of key-input section 10a. Alternatively, slide switch 10c can be used to designate the reading width, as is shown in FIG. 7 which illustrates a second embodiment of the present invention.

The hand-held copier of the second embodiment has slide switch 10c on the front of housing 1. Slide switch 10c has projection 10d which can be pushed to the left or the right, for a distance up to 40 mm. The position of this projection 10d defines a reading width. The data representing this reading width is input to control section 51 shown in FIG. 4.

The copier of the second embodiment can read and print image data in the same way as the first embodiment, as is shown in the flow charts of FIGS. 5 and 6.

A third embodiment of the invention will be described. In the first and second embodiments, the reading width is designated by electronic means. In the third embodiment, the reading width is set by mechanical means. More precisely, a sliding member is moved, thereby to close and open, to various degrees, the image data-reading window made in housing 1, in order to designate a desired reading width.

The third embodiment will be described in detail, with reference to FIGS. 8 to 12. In these figures, the same numerals designate the components identical to those of the first embodiment.

A pair of sliding members 46a and 46b for adjusting the reading width are slidably fitted in data-reading window 12. The backs of sliding members 46a and 46b, which oppose light source 11, are coated white so that their reflectivity is about 80%. Alternatively, these members are made with a plate of transparent material such as acrylic resin and surfaces thereof are coated white, thereby eliminating variation in focal distance viewed from light source 11. Pointers 47 is integrally formed with each of sliding members 46a and 46b at the ends thereof, so that pointers 47 are located on scale 48 provided on the lower edge of the front of housing 1. When sliding members 46a and 46b are moved, pointers 47 are also moved for the same distance. Therefore, the positions of pointers 47 with respect to scale 48 indicate the reading width selected by moving sliding members 46a and 46b.

Figure 12:
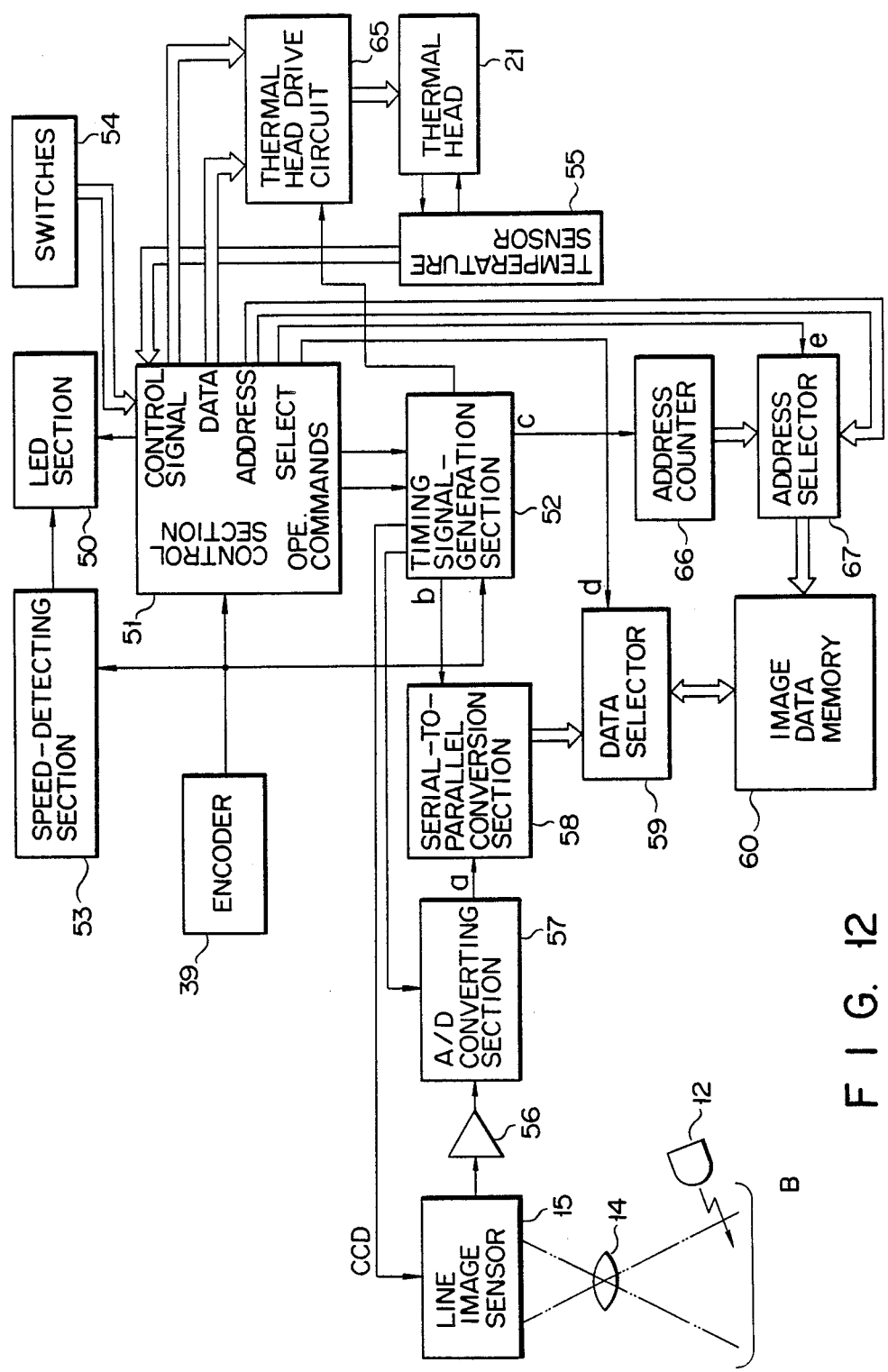
FIG. 12 is a block diagram showing the electronic circuit of the copier shown in FIG. 8.

The electronic circuit of the third embodiment will now be described, with reference to FIG. 12. In this figure, the same numerals denote the components which are identical to those shown in FIG. 4. As has been described, encoder 39 comprises encoder disk 34, LED 36, and photosensor 37, and outputs a pulse signal representing the distance for which housing 1 has been moved. The output signal of encoder 39 is supplied to control section 51, timing signal-generating section 52, and speed-detecting section 53. Speed-detecting section 53 detects, from the output signal of encoder 39, whether or not the speed of housing 1 is higher than a preset value. When section 53 detects that housing 1 is being moved at a speed higher than the preset value, it causes LED 10 of LED section 50, i.e., a speed alarm lamp, to emit light. Various operations signals are supplied to control section 51 from power/read/print switch 4, operation keys 5a and 5b, clear key 6, density control dial 7, and switches 54. Further, a temperature signal is supplied to control section 51 from temperature sensor 55 which has detected the temperature of thermal head 21. Control section 51 is provided with a powersource voltage detector (not shown). In accordance with the input signals, control section 51 controls LED 8 (power-supply monitor), LED 9 (memory pilot lamp), both included in LED section 50, and other components. It also gives an operation command to timing signal-generating section 52 when power/read/print switch 4 is operated, thus setting the copier in a reading mode or a printing mode. Timing signal-generating section 52 generates CCD-exposure timing signals at regular intervals, in response to the command supplied from control section 51. Further, section 52 generates various timing signals such as a predetermined number of read-timing signals a, serial-to-parallel conversion signals b, and clock pulses c, in synchronism with the output signal of encoder 39. The CCD-exposure timing signals output from timing signal-generating section 52 are supplied to line image sensor 15. Read-timing signals a are supplied to A/D converting section 57. Serial-to-parallel conversion signals b are supplied to serial-to-parallel conversion section 58. Clock pulses c are supplied to address counter 61. Line image sensor 15 receives the light reflected from original B in synchronism with the CCD-exposure timing signals, and produces output signals. The output signals of the image sensor are output to A/D converting section 57 via amplifier 56. A/D converting section 57 converts these signals into binary signals, i.e., black and white signals, in synchronism with read-timing signals a. The binary signals are supplied to serial-to-parallel conversion section 58. Serial-to-parallel conversion section 58 converts the input signals into, for example, an 8-bit parallel signal. This parallel signal is output to image data memory 60 through data selector 59. Data selector 59 is connected to control section 51 by a data line, and selects either control section 51 or serial-to-parallel conversion section 58 in accordance with selection signal d supplied from control section 51. Any desired write address of image data memory 60 (a line-address and a digit-address) is defined by the count value of address counter 66 and designated by address selector 67. On the other hand, any desired read address of image data memory 60 is given from control section 51 through address selector 67. Address selector 67 selects, in accordance with selection signal e output from section 51, address counter 66 when the copier is set in the reading mode, and selects control section 51 when the copier is set in the printing mode, thereby to designate the desired address of image data memory 60.

When the hand-held copier is set in the printing mode after the image has been read from the original, control section 51 starts sequentially reading the data stored in image data memory 60 through data selector 59, in response to the output signal of encoder 39. After reading the image data from image data memory 60, control section 51 calculates the time for supplying power to thermal head 21, on the basis of the temperature of head 21 detected by temperature sensor 55, the data output by the power-source voltage detector, and the density selected by turning density control dial 7. The data representative the power-supplying time is output as print data to thermal head-driving circuit 65. In accordance with this print data supplied from section 51, thermal head-driving circuit 65 drives thermal head 21 in synchronism with the timing signals supplied from timing signal-generating section 52.

The operation of the third embodiment described above will now be explained. In order to read image data, such as characters and an image, from an original, a user first moves sliding members 46a and 46b, thereby to set a desired reading width. Since pointers 47 move as sliding members 46a and 46b are moved for this purpose, the user can recognize the reading width by reading those graduations of scale 48 which are pointed by pointers 47. Then, the user moves power/read/print switch 4 from a "power off" position to a "read" position. Therefore, power is supplied to the circuit components. At this time, control circuit 51 turns on LED 8 of LED section 50, thereby informing that the copier has been turned on. The user sweeps housing 1 of the copier across a desired part of original B forwardly in the direction of operation key 5a (FIG. 1) side, while keeping reading section 2 of head section HA in contact with original B and depressing both operation keys 5a and 5b. The light emitted from light source 11 is applied onto original B through reading window 12 cut in inclined surface 1a. The light is reflected from original B and guided by light guide 13. The light is finally applied via lens 14 to line image sensor 15. The opening length of window 12, i.e., the reading width, is the distance between sliding members 46a and 46b which have been moved to desired positions.

As housing 1 of the hand-held copier is moved, rubber rollers 25a and 25b, both contacting original B, are rotated. The rotation of the rubber rollers is transmitted to gear 28 by gears 26 and 27. Hence, gear 28 is rotated, thereby rotating encoder disk 34 at a speed proportional to the speed at which housing 1 is being moved. As encoder disk 34 rotates in this manner, the light emitted from LED 36 is intermittently applied to photosensor 37 through slits 36. Photosensor 37 produces pulses, thus generating a pulse signal, i.e., the output signal of encoder 39 shown in FIG. 12. This output signal, which represents the distance the copier has been moved, is supplied to control section 51, timing signal-generating section 52, and speed-detecting section 53. Timing signal-generating section 52 generates CCD-exposure timing signals at regular intervals and supplies these signals to line image sensor 15. Further, section 52 generates read-timing signals a and serial-to-parallel conversion signals b in response to the output signal of encoder 39, and supplies signals a to A/D converting section 57 and signals b to serial-to-parallel conversion section 58. Still further, timing signal-generating section 52 generates clock pulses c in synchronism with serial-to-parallel conversion signals b, and supplies these pulses c to address counter 66 and address selector 67.

Line image sensor 15 produces image signals from the light reflected from original B, in synchronism with CCD-exposure timing signals supplied from timing signal-generating section 52. The image signals are amplified by amplifier 56 and then supplied to A/D converting section 57. A/D converting section 57 converts the image signals output from amplifier 56, into a serial, digital signal, in synchronism with read-timing signals a supplied from timing signal-generating section 52. The digital signal is input to serial-to-parallel conversion section 58. Serial-to-parallel conversion section 58 converts the serial digital signal into, for example, 8-bit parallel image data, in synchronism with serial-to-parallel conversion signals b supplied from timing signal-generating section 52. The 8-bit image data is output to data selector 59. Data selector 59 selects the output of the serial-to-parallel conversion section 58 when the copier is set in the reading mode, in response to selection signal d supplied from control section 51. Therefore, the image data output from serial-to-parallel conversion section 58 is supplied via data selector 59 to image data memory 60. The addresses of image data memory 60 are designated by address selector 67. In this case, address selector 67 selects the output of address counter 66 in accordance with selection signal e supplied from control section 51. Therefore, the addresses of memory 60 are designated by the count value of address counter 66. The count value of address counter 66 is incremented by "+1" every time a clock pulse c is input to counter 66 from timing signal-generating section 52. Thus, the addresses of image data memory 60 are sequentially designated. Timing signal-generating section 52 stops generating timing signals when the image data for one line has been written into image data memory 60. It remains to produce timing signals until it receives the next pulse signal from encoder 39, which represents the distance the copier has been moved. The sequence of the above operations is repeated, whereby the image data read from original B through reading window 12 by scanning original over the preset reading width, and written into image data memory 60.

It will now be explained how the copier of the third embodiment is operated to print the image data read from original B in the way described above. To print the image data, the user moves power/read/print switch 4 to a "print" position, thereby setting the copier in the printing mode. Then, control section 51 supplies selection signals d and e, whereby data selector 59 and address selector 67 select control section 51. In this condition, the user sweeps housing 1 across a sheet of paper A in the direction of arrow X (FIG. 1), while keeping printing section 3 of head section HA in contact with paper A and depressing both operation keys 5a and 5b. As housing 1 is moved in this manner, rubber rollers 25a and 25b rotate, thus rotating gears 26, 27, and 28. Encoder disk 34 is therefore rotated. Photosensor 37 outputs pulses, as in the case of reading the image data, which form a signal which represents the distance the copier has been moved across paper A.

The rotation of gear 28 is transmitted by one-way clutch 33 to ribbon-feeding roller 23, and further to ribbon take-up roller 24 by gears 29 and 30. As rollers 23 and 24 rotate, ribbon roll 22 also rotates. Hence, ink ribbon 22a is fed from roll 22 and guided through slit 43 cut in stepped portion D. Ribbon 22a then passes by heating section 21a of thermal head 21. The ribbon is further guided through ink ribbon guide 44, and ribbon-feeding roller 23. Finally, ribbon 22a is taken up around ribbon take-up roller 24. As housing 1 is moved, ribbon-feeding roller 23 rotates such that ribbon 22a is fed at the same speed as housing 1 is being moved across paper A. Hence, no relative movement occurs between ribbon 22a and paper A.

In the meantime, the output signal of encoder 39, i.e., the output pulses of photosensor 37, which represents the distance the copier has been moved, is supplied to control section 51, timing signal-generating section 52, and speed-detecting section 53. Timing signal-generating section 52 supplies print-timing signals to thermal head-driving circuit 65 in response to the output signal of encoder 39. Control section 51 designates, in response to the output signal of encoder 39, the line addresses and digit addresses of image data memory 60, one after another, thereby reading the image data from memory 60 through data selector 59. Further, control section 51 sets the time for supplying power to thermal head 21, based on the temperature of head 21 detected by temperature sensor 55, the output signal of the power-source voltage detector, and the density selected by turning density control dial 7. Then, control section 51 supplies thermal head-driving circuit 65 with the image data read out of image data memory 60. Thermal head-driving circuit 65 drives thermal head 21 in accordance with the control data supplied from control section 51 and the timing signals output from timing signal-generating section 52. Thermal head 21, therefore, prints the image data on paper A by using ink ribbon 22a. As housing 1 of the hand-held copier is moved across paper A, the unused portion of ink ribbon 22a is fed from roll 22, whereas the used portion of ribbon 22a is taken up around ribbon take-up roller 24. In this manner, the image data stored in image data memory 60 is printed on paper A as housing 1 is swept across paper A.

We claim:

1. A manually sweeping apparatus, including a manually manipulatable housing, said housing comprising:
   reading means having a reading area with a predetermined length, for reading image information on a material and for producing image information signals in accordance with the image information, while said housing is manually swept across the material in a direction substantially perpendicular to a direction of the length of the reading area;
   memory means for storing the image information signals produced by said reading means;
   designating means for designating a reading length over which the image information will read, said reading length being in a direction of the length of said reading area;
   position detecting means for detecting a relative position of said housing with respect to said material while said housing is being swept across said material, and for producing a position signal every time said housing is swept over a predetermined distance, said position signal representing the position of said housing with respect to said material; and
   storing control means for controlling a storing operation of said memory means in response to the reading length designated by said designated means, and for storing the image information signals produced by said reading means into said memory means, said image information signals corresponding to image information which exists on said material in the reading length designated by said designating means.

2. The manually sweeping apparatus of claim 1, wherein said storing control means includes:
   addressing means for designating a memory area of said memory means which has a capacity to store the image information signals corresponding to said image information existing on said material in said reading length designated by said designating means, in response to every time a position signal is output from said position detecting means.

3. The manually sweeping apparatus of claim 2, wherein said addressing means includes:
   arithmetic means for obtaining the storage capacity required to store the image information signals corresponding to said image information existing in said reading length designated by said designating means;
   address designating means for designating a memory area of said memory means in sequence, after a position signal is output from said position detecting means;
   detecting means for detecting whether or not a capacity of the memory area which has been designated by said address designating means coincides with the capacity obtained by said arithmetic means; and
   inhibiting means for inhibiting a designating operation of said address designating means, when said detecting means detects that the capacity of the memory area which has been designated by said address designating means coincides with the capacity obtained by said arithmetic means.

4. The manually sweeping apparatus of claim 1, wherein said position detecting means includes means for detecting the relative position of said housing while being swept across either of the material or a printing medium, and for producing said position signal every time said housing is swept over a predetermined distance, said position signal representing the position of said housing with respect to either of the material or the printing medium;
   and wherein said housing further includes:
   printing means for printing image information corresponding to the image information signals output from said memory means on the printing medium while said housing is manually swept across the printing medium; and
   printing control means (51, 65) for controlling said printing means in synchronism with the position signal produced by said position detecting means.

5. The manually sweeping apparatus of claim 4, wherein said housing further includes:
   output control means for controlling an output operation of said memory means in response to the reading length designated by said designating means, and for outputting image information signals which have been stored in said memory means to said printing means, which outputted image information signals correspond to the image information existing in the reading length designated by said designating means on the material.

6. The manually sweeping apparatus of claim 5, wherein said output control means includes:
   addressing means for designating a memory area of said memory means which has a capacity to store the image information signals corresponding to said image information existing on said material in said reading length designated by said designation means, before said printing means causes a printing operation.

7. The manually sweeping apparatus of claim 6, wherein said addressing means includes:
   arithmetic means for obtaining the storage capacity required to store the image information signals corresponding to said image information existing in said reading length designated by said designating means;
   address designating means for designating a memory area of said memory means in sequence, before said printing means causes a printing operation;
   detecting means for detecting whether or not a capacity of the memory area which has been designated by said address designating means coincides with the capacity obtained by said arithmetic means; and
   inhibiting means for inhibiting a designating operation of said address designating means when said detecting means detects that the capacity of the memory area which has been designated by said address designating means coincides with the capacity obtained by said arithmetic means.

8. The manually sweeping apparatus of claim 5, wherein:
said reading means produces dot pattern signals according to image information on the material;
said printing means has a group of printing elements provided in a number the same as a number of dots constituting the dot pattern signals produced by said reading means, and includes means for operating a dot pattern according to the dot pattern signals output from said memory means; and
said printing control means includes signal-supplying means for supplying a mask signal to said printing elements which does not supply the dot pattern signals for said memory means, when the number of dots constituting the dot pattern signals output from said memory means is less than the number of said printing elements.

9. The manually sweeping apparatus of claim 5, wherein said reading means includes:
light source means for illuminating the material; and
image sensing means having a group of light-receiving elements provided in a predetermined number and arranged in one line, for receiving the light reflected from the material and for converting the received light into electrical signals having levels corresponding to the amount of received light;
and said printing means includes a thermal printing head.

10. The manually sweeping apparatus of claim 1, wherein said designating means includes key input means for inputting numerical data which indicates the reading length.

11. A manually sweeping apparatus, including a manually manipulatable housing (1), said housing comprising:
reading means having a reading area with a predetermined length, for reading image information on a material and for producing image information signals in accordance with the image information signals according to the image information, while said housing is manually swept across the material in a direction substantially perpendicular to a direction of the length of the reading area;
memory means for storing the image information signals produced by said reading means;
printing means for printing the image information according to the image information signals output from said memory means on a printing medium while said housing is manually swept across the printing medium;
position detecting means for detecting a relative position of said housing while being swept across either of the material or the printing medium, and for producing a position signal every time said housing is swept over a predetermined distance, said position signal representing the position of said housing with respect to either of the material or the printing medium;
printing control means for controlling said printing means in synchronism with the position signal produced by said position detecting means;
designating means for designating a reading length over which the image information will be read in a direction of the length of said reading area;
memory control means for controlling a storing operation and an output operation of said memory means in response to the reading length designated by said designating means, and for storing the image information signals into said memory means;
wherein said image information signals corresponding to the image information existing in the reading length on the material designated by the designated means, when said reading means causes the reading operation, to obtain image information signals stored in said memory means, are supplied to said printing means when said printing means causes a printing operation.

12. The manually sweeping apparatus of claim 11, wherein said memory control means includes:
addressing means for designating a memory area of said memory means which has a capacity to store the image information signals corresponding to said image information existing on said material in said reading length designated by said designating means.

13. The manually sweeping apparatus of claim 12, wherein said addressing means includes:
arithmetic means for obtaining the storage capacity required to store the image information signals corresponding to said image information existing in said reading length designated by said designating means;
storage means for storing the capacity obtained by said arithmetic means;
first address designating means for designating a memory area of said memory means in sequence, after a position signal is output from said position detecting means when said reading means causes the reading operation;
second address designating means for designating a memory area of said memory means in sequence, before said printing means causes the printing operation;
detecting means for detecting whether or not capacity of the memory area designated by either of said first address designating means or said second address designating means coincide with the capacity stored in said storage means; and
inhibiting means for inhibition a designating operation of said first address designating means and said second address designating means when said detecting means detects that the capacity of the memory area designated by either of said first address designating means or said second address designating means coincides with the capacity of said storage means.

14. The manually sweeping apparatus of claim 13, wherein:
said reading means produces dot pattern signals according to image information on the material;
said printing means has a group of printing elements provided in a number the same as a number of dots constituting the dot pattern signals produced by said reading means, and includes means for printing a dot pattern according to the dot pattern signals output from said memory means; and
said printing control means includes signal-supplying means for supplying a mask signal to said printing elements which does not supply the dot pattern signals from said memory means when the number of dots constituting the dot pattern signals output from said memory means is less than the number of said printing elements.

15. The manually sweeping apparatus of claim 14, wherein said reading means includes:
light source means for illuminating the material; and
image sensing means having a group of light-receiving elements provided in a predetermined number and arranged in one line, for receiving the light reflected from the material and for converting the received light into electrical signals having levels corresponding to the amount of received light;
and said printing means includes a thermal printing head.

16. The manually sweeping apparatus of claim 15, wherein said designating means includes key input means for inputting numerical data which indicates the reading length.

17. A hand-held copier, including a hand-held housing, said hand-held housing comprising:
light source means for illuminating a reading medium having image data thereon;
a group of light-receiving elements provided in a predetermined number and arranged in one line, for receiving light reflected from the reading medium and for converting the reflected light into analog electrical signals, so as to obtain electrical signals corresponding to the image data on the reading medium;
A/D converting means for converting said analog electrical signals from said group of light-receiving elements into digital signals, and for outputting said digital signals;
first memory means for storing the digital signals output by said A/D converting means;
input means for inputting width data designating a reading width over which image data will be read, said reading width being measured in the direction of arrangement of the line of said light-receiving elements;
output means for outputting the digital signals stored in said first memory means;
counting means for counting the digital signals output by said A/D converting means;
second memory means for storing the width data input from said input means;
comparing means for comparing a count value of said counting means with the width data stored in said second memory means; and
means for controlling the writing of the digital signals output by said A/D converting means into said first memory means in accordance with results of a comparison performed by said comparing means.

* * * * *

UNITED STATES PATENT AND TRADEMARK OFFICE
CERTIFICATE OF CORRECTION

PATENT NO. : 4,899,228

DATED : February 6, 1990

INVENTOR(S) : T. SANO

It is certified that error appears in the above-identified patent and that said Letters Patent is hereby corrected as shown below:

On the title page, delete the name of the second inventor:

Masaharu SHIOYA

Signed and Sealed this

Twelfth Day of May, 1992

*Attest:*

DOUGLAS B. COMER

*Attesting Officer*     Acting Commissioner of Patents and Trademarks